United States Patent [19]
Okuyama

[11] Patent Number: 5,825,821
[45] Date of Patent: Oct. 20, 1998

[54] HITLESS SWITCH DEVICE AND METHOD OF SWITCHING BETWEEN DIFFERENT PATHS

[75] Inventor: Keiichi Okuyama, Tokyo, Japan

[73] Assignee: NEC Corporation, Tokyo, Japan

[21] Appl. No.: 613,850

[22] Filed: Mar. 11, 1996

[30] Foreign Application Priority Data

Mar. 10, 1995 [JP] Japan ..................................... 7-050754

[51] Int. Cl.⁶ .............................. H04K 1/10; H04L 27/28
[52] U.S. Cl. ........................... 375/260; 370/228; 370/519
[58] Field of Search ............................. 375/260; 370/510, 370/519, 225, 228; 359/117; 340/825.03

[56] References Cited

U.S. PATENT DOCUMENTS

| | | | |
|---|---|---|---|
| 4,380,814 | 4/1983 | Shinmyo | 375/267 |
| 4,686,675 | 8/1987 | Motimoto et al. | 340/825.01 |
| 5,471,332 | 11/1995 | Shiragaki et al. | 359/117 |

FOREIGN PATENT DOCUMENTS

| | | |
|---|---|---|
| 63-98259 | 4/1988 | Japan . |
| 5-153103 | 6/1993 | Japan . |
| 5-183469 | 7/1993 | Japan . |

*Primary Examiner*—Temesghen Ghebretinsae
*Attorney, Agent, or Firm*—Ostrolenk, Faber, Gerb & Soffen, LLP

[57] ABSTRACT

A termination cross-connect device, receiving the first and second digital signals from the previous cross-connect device through different routes, checks whether the sink-side J1 identification is included in the first and second digital signals. When it is included, the termination cross-connect device adjusts a phase difference between the first and second digital signals based on the J1 byte such that the first and second digital signals coincide in phase with each other. After the first and second digital signals coincide in phase with each other, the hitless switching is performed from the first path to the second path. Not only a route length delay differences but also interconnection delays developed in the previous cross-connect device may be canceled out by performing the delay adjustment when the cross-connect switch of the previous cross-connect device is active but when it is inactive.

12 Claims, 3 Drawing Sheets

HITLESS SWITCH DEVICE AND METHOD OF SWITCHING BETWEEN DIFFERENT PATHS

BACKGROUND OF THE INVENTION

1. Field of the invention

The present invention generally relates to a digital transmission system, and in particular to a hitless switch device and method which switches between different paths or transmission lines.

2. Description of the Related Art

Recently, the synchronous digital interface has been standardized in ITU-T (the former CCITT) by the name of SDH (Synchronous Digital Hierarchy)-NNI (Network Node Interface). SDH-based networks will be expected to achieve efficient network construction, effective network operations, and various network services. Since SDH-based systems are characterized by synchronous operations, SDH frame signals can be switched from one transmission route to the other without suffering any hit which is a momentary change in the phase or amplitude of the signal. In the case of the hitless switching between different transmission routes, it is necessary to adjust the amount of route delay to absorb phase differences between arrival SDH signals caused by the differences in route length. Several methods for absorbing such phase differences have been disclosed in Japanese Patent Application Laid-open Nos. 63-98259, 5-153103, and 5-183469.

For simplicity, consider a digital transmission system as shown in FIGS. 1 and 2, where cross-connect devices 1–3 are connected to each other. Referring to FIG. 2, receiving an input SDH signal from a path termination device, a sink-side J1-$ID_1$ insertion device 10 of the cross-connect device 1 inserts a unique identification data ($ID_1$ : source identification number) into the J1 which is the first byte of a Virtual Container (VC-3 or VC-4) of the input SDH signal. After that, the SDH signal including $ID_1$ branches into two SDH signals at an active cross-connect switch 11 and then the two ADH signals are transferred through a route A and a route B, respectively. The route A directly connects the cross-connect device 1 to the cross-connect device 3 and the route B connects the cross-connect device 1 to the cross-connect device 3 via the cross-connect device 2. The SDH signal of the route A passes through a hitless switch device 12 and then a source-side J1-$ID_2$ insertion device 13. Similarly, the other SDH signal of the route B passes through a hitless switch device 14 and then a source-side J1-$ID_3$ insertion device 14. In this manner, the same SDH signal having $ID_1$ included in the J1 thereof is transmitted to the cross-connect device 3 through different routes A and B when the cross-connect switch 11 is set to be active.

On the other hand, when the cross-connect switch 11 is set to be inactive, the source-side J1-$ID_1$ insertion devices 13 and 15 insert path identification data $ID_2$ and $ID_3$ into the J1s of the Virtual Containers of idle SDH signals and then transmit them to the cross-connect device 3 through the routes A and B, respectively.

The cross-connect device 3 has an input interface circuit including sink-side J1-ID insertion devices 21 and 22 which receive the two SDH signals from the cross-connect device 1 through the route A and the route B, respectively. The received SDH signals are sent to a hitless switch device 24 through a cross-connect switch 23. The hitless switch device 24 is provided with respective route delay adjustment circuits corresponding to the routes A and B. The route delay adjustment circuits adjust the amount of delay in output timing of the respective SDH signals to synchronize to each other based on the J1s. In other words, the route delay adjustment circuits absorb the phase differences between the received SDH signals which are caused by the route length difference between the routes A and B. When the synchronization between the SDH signals of the routes A and B is established, the output signal of the hitless switch device 24 is switched from the SDH signal of the route A to that of the route B without a hit.

However, some delay inevitably develops in the cross-connect switch 11 when it is making interconnections, that is, active. Therefore, the initial delay which was determined when the cross-connect switch 11 was inactive becomes inappropriate due to different interconnection delays developed in the cross-connect switch 11 which is active, resulting in phase differences of the J1s of the SDH signals received through different routes. More specifically, as described above, for the route A, the ID data $ID_2$ is inserted into the J1 of the SDH signal by the source-side J1-$ID_2$ insertion device 13 when the cross-connect switch 11 is inactive but the ID data $ID_1$ is inserted by the sink-side J1-$ID_1$ insertion device 10 when the cross-connect switch 11 becomes active. Similarly, for the route B, the ID data $ID_3$ is inserted into the J1 of the SDH signal by the source-side J1-$ID_3$ insertion device 15 when the cross-connect switch 11 is inactive but the ID data $ID_1$ is also inserted by the sink-side J1-$ID_1$ insertion device 10 when the cross-connect switch 11 becomes active. Since the hitless switch device 24 performs the route delay adjustment and the hitless switching based on the J1s of the SDH signals, the accurate hitless switching cannot be achieved in cases where the initial delay is determined when the cross-connect switch 11 is inactive, because different interconnection delays for respective paths are developed in the cross-connect switch 11.

Further, consider the case where the cross-connect device 3 determines the amount of initial delay in situations where the cross-connect device 3 currently uses a route from the cross-connect device 1 to the cross-connect device 3 via the cross-connect device 2 and is about to switch over to another route from the cross-connect device 1 to the cross-connect device 3. The settings of a cross-connect device and the amount of initial delay are performed according to instructions received from a host controller.

In cases where the settings of the cross-connect device 2 and the initial delay of the cross-connect device 3 are simultaneously instructed, there are possibilities that the setting of the initial delay of the cross-connect device 3 is performed earlier than that of the cross-connect device 2 depending on the arrival timing of setting commands from the host controller or the waiting time for processing. Therefore, although the initial delay should be determined based on the sink-side J1-$ID_1$ of the cross-connect device 1, actually the initial delay is determined based on the source-side J1-ID of the cross-connect device 2. Especially, in cases where the cross-connect device 2 is located at a considerable distance from the cross-connect device 1, if the cross-connect device 2 is set after the initial delay is determined based on the source-side J1-ID of the cross-connect device 2, the amount of delay set in the cross-connect device 3 becomes greater than a desired initial delay. The reason is that the J1-ID received by the cross-connect device 3 is delayed by the amount of the transmission delay time caused by the distance between the cross-connect devices 1 and 2. When a longer delay is set in the cross-connect device 3, the data transmission is increasingly delayed, resulting in an additional delay problem.

SUMMARY OF THE INVENTION

An object of the present invention is to provide a hitless switching method and device which enables the hitless switching between a plurality of paths with reliability.

Another object of the present invention is to provide a system and method which switches from a first path to a second path after respective digital signals received through the first and second paths have been synchronized to each other.

Still another object of the present invention is to provide a hitless switching method and device which enables the hitless switching between a plurality of transmission lines which are connected to an interconnection device as a previous stage.

According to the present invention, not only a route length delay differences but also interconnection delays developed in the interconnection device may be canceled out by performing the delay adjustment when the interconnection device is active but when it is inactive.

More specifically, when the interconnection device is not in an active state, source-side identification data is inserted into a predetermined field of a frame of each of first and second digital signals, and the first and second digital signals including the source-side identification data are output to a termination device through the first and second paths, respectively. Alternatively, when the interconnection device is in an active state, sink-side identification data is inserted into the predetermined field of a frame of an input digital signal to output it to the interconnection device. In the interconnection device, the input digital signal including the sink-side identification data branches into the first and second digital signals including the sink-side identification data, and they are output to the termination device through the first and second paths, respectively.

Receiving the first and second digital signals from the interconnection device, the termination device checks whether the sink-side identification data is included in the first and second digital signals received from the interconnection device through the first and second paths. When the sink-side identification data is included in the first and second digital signals received from the interconnection device, the termination device adjusts a phase difference between the first and second digital signals based on data of the predetermined field such that the first and second digital signals coincide in phase with each other. The phase difference is caused by a path length difference between the first and second paths. After the first and second digital signals coincide in phase with each other, that is, the synchronization is established between the first and second digital signals, the hitless switching is performed from the first path to the second path.

Preferably, the first and second digital signals may be SDH frame signals, for instance, and the predetermined field of a frame is the J1 byte for a path tracer.

DETAILED DESCRIPTION OF THE PREFERRED EMBODIMENTS

Figure 2:
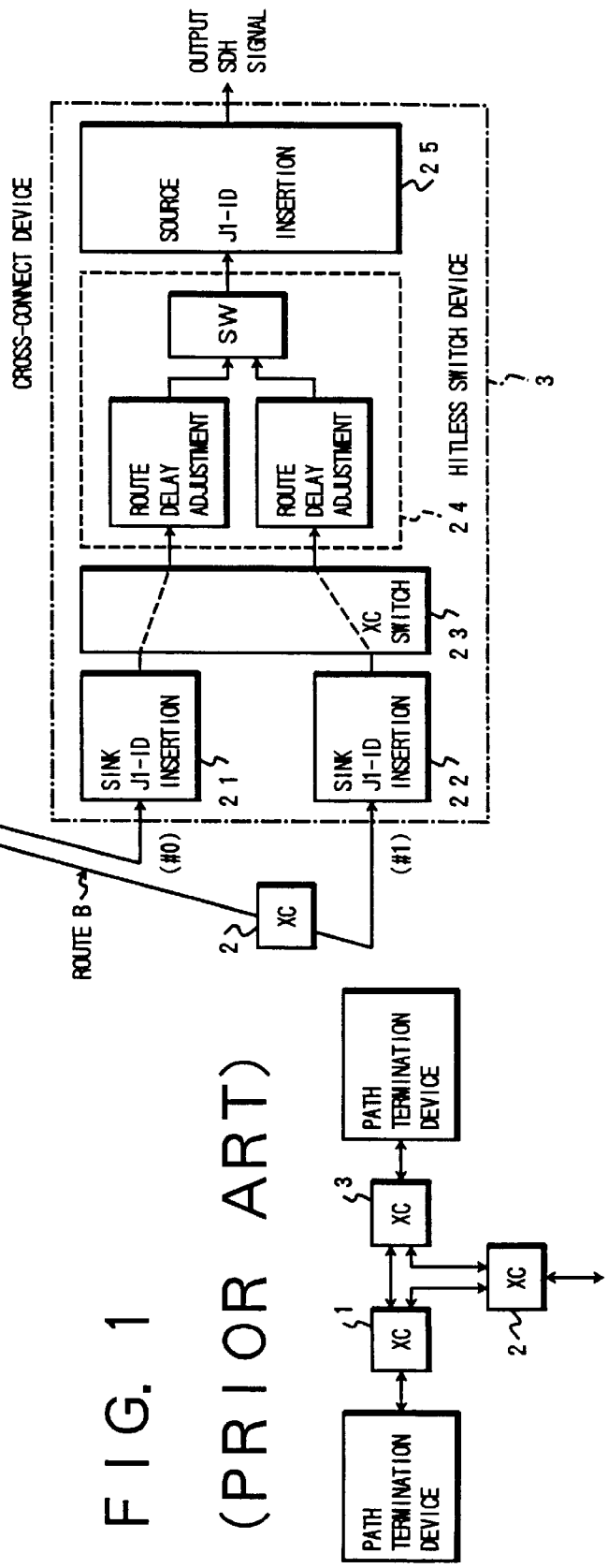
FIG. 2 is a detailed block diagram showing the cross-connect configuration of FIG. 1.
Figure 3:
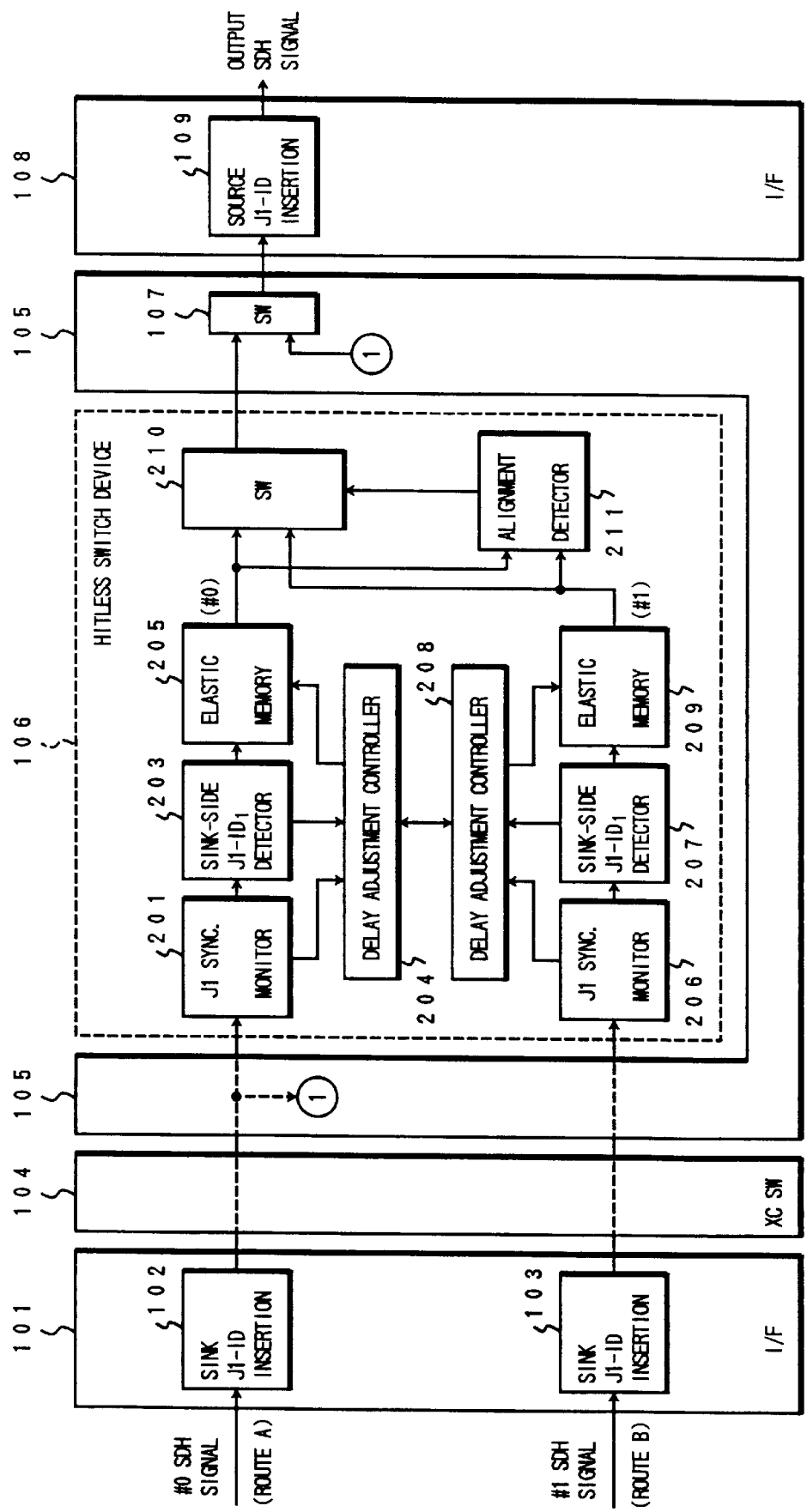
FIG. 3 is a block diagram showing a cross-connect device employing a hitless switch device according to an embodiment of the present invention.

Referring to FIG. 3, a cross-connect device is composed of an sink-side interface circuit 101 including sink-side J1-ID insertion devices 102 and 103. Taking the configuration as shown in FIG. 2 as an example, let us assume that the sink-side J1-ID insertion devices 102 receives a first SDH signal (#0) through the route A and the sink-side J1-ID insertion devices 103 receives a second SDH signal (#1) through the route B. As described above, since the input SDH signal branches into the first SDH signal and the second SDH signal at the cross-connect switch 11 of the cross-connect device 1, these SDH signals are the same signal but different in phase due to not only different route lengths between the routes A and B but also different interconnection delays in the cross-connect switch 11. The #0 and #1 SDH signals pass through a cross-connect switch 104 and a hitless switching interface 105 and then enter a hitless switch device 106. The hitless switch device 106 hitlessly switches from the route A to the route B at the time when the #0 and #1 SDH signals are synchronized with each other as described in detail later. The output SDH signal of the hitless switch device 106 is sent to a hitless switch 107 which selects one of the output SDH signal of the hitless switch device 106 and the #0 SDH signal. The output SDH signal of the hitless switch 107 is transferred to a source-side interface 108 where a source-side J1-ID insertion device 109 inserts a unique ID data into the J1 of the SDH signal received from the hitless switch 107 and then transmits it to a path termination device (see FIG. 1).

The hitless switch device 106 is composed of a first system (#0), a second system (#1), and a switch for switching between these systems. The first system is composed of a J1 synchronization monitor 201, a sink-side $ID_1$ detector 203, a delay adjustment controller 204, and an elastic memory 205. The first SDH signal is written onto and read from the elastic memory 205 under control of the delay adjustment controller 204. In cases where the #0 system is current, the delay adjustment controller 204, receiving a synchronization establishment signal from the J1 synchronization monitor 201 and the $ID_1$ detection signal from the sink-side J1-$ID_1$ detector 203, determines the amount of initial delay and adjusts the reading timing of the first SDH signal from the elastic memory 205 according to the initial delay.

The second system is composed of a J1 synchronization monitor 206, a sink-side $ID_1$ detector 207, a delay adjustment controller 208, and an elastic memory 209. The second SDH signal is written onto and read from the elastic memory 209 under control of the delay adjustment controller 208. In cases where the #1 system is reserved, the delay adjustment controller 208, receiving a synchronization establishment signal from the J1 synchronization monitor 206 and the $ID_1$ detection signal from the sink-side J1-$ID_1$ detector 207, adjusts the reading timing of the second SDH signal from the elastic memory 209 so as to coincide with that of the first SDH signal from the elastic memory 205.

The SDH signals read from the elastic memories 205 and 209 are output to a selection switch 210 which selects one of these SDH signals according to an alignment detection signal received from an alignment detector 211. The alignment detector 211 checks whether the reading timing of the second SDH signal from the elastic memory 209 coincides with that of the first SDH signal from the elastic memory 205. When the first SDH signal is synchronized with the second SDH signal, the alignment detection signal is output to the switch 210. The switch 210 switches between the #0 and #1 systems when receiving the alignment detection signal from the alignment detector 211, resulting in the hitless switching.

Figure 4:
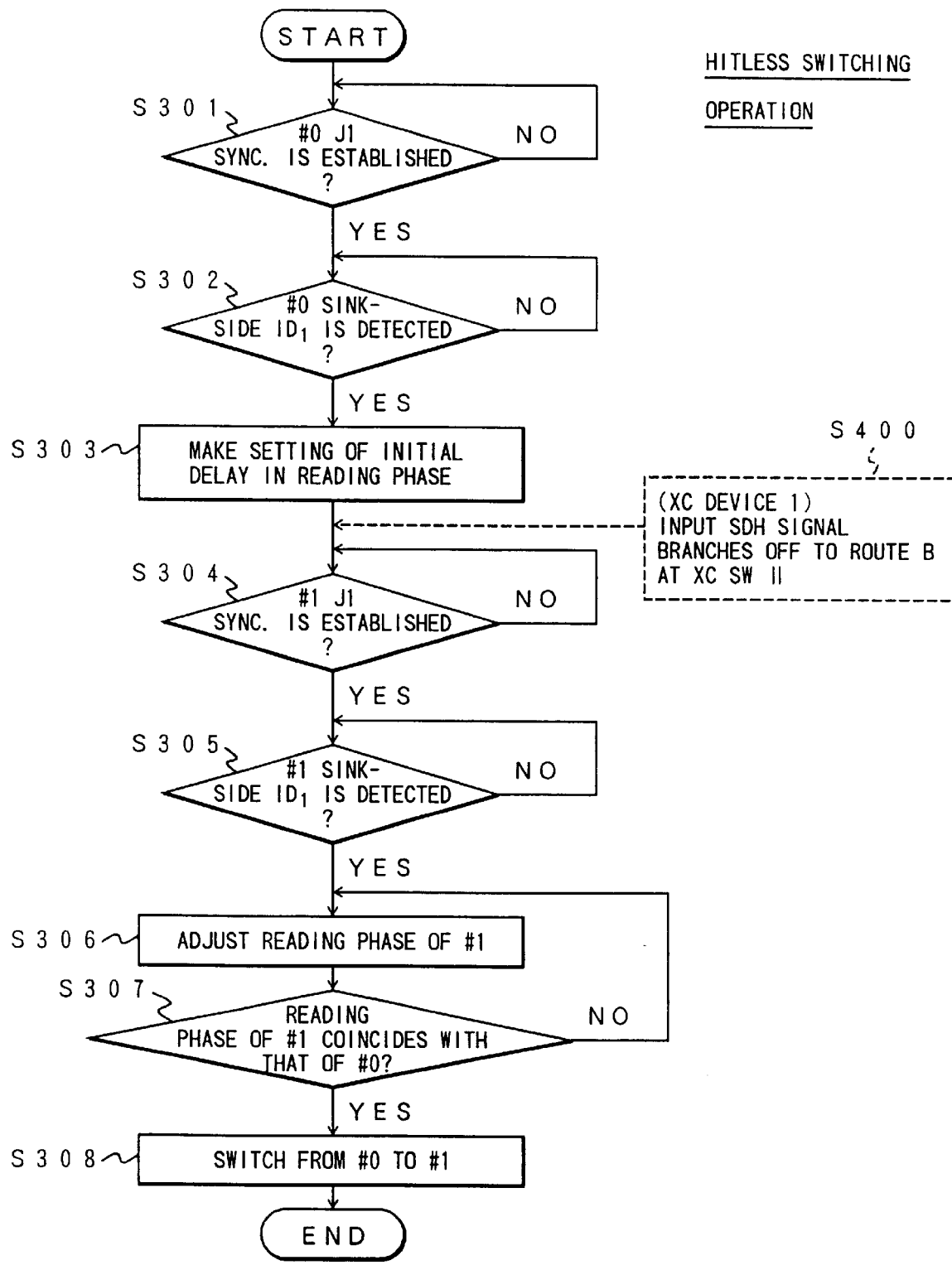
FIG. 4 is a flowchart showing a hitless switching operation according to the embodiment of the present invention.

Referring to FIG. 4, an embodiment of the hitless switching operation according to the present invention will be described. For simplicity, assume that the #0 system is current and the #1 system is reserved. Therefore, the switch 210 is on the #0 position.

When receiving the first SDH signal through the route A, the delay adjustment controller 204 stores the first SDH signal into the elastic memory 205 and the J1 synchronization monitor 201 monitors the J1 byte of the first SDH signal to check whether the synchronization is established (step S301). After the J1 synchronization is established (YES in step S301), the sink-side $ID_1$ detector 203 checks whether the J1 byte of the first SDH signal includes the sink-side identification data $ID_1$ which was inserted by the sink-side J1-$ID_1$ insertion device 10 of the previous cross-connect device 1 (step S302). When the sink-side identification data $ID_1$ is detected from the J1 byte of the first SDH signal (YES in step S302), the delay adjustment controller 204 determines the amount of initial delay in reading the first SDH signal from the elastic memory 205 and then adjusts the reading timing of the first SDH signal from the elastic memory 205 according to the initial delay (step S303).

When the cross-connect switch 11 of the cross-connect device 1 causes the input SDH signal to branch into the first and second SDH signals of the routes A and B (S400), the delay adjustment controller 208 stores the second SDH signal into the elastic memory 209 and the J1 synchronization monitor 206 monitors the J1 byte of the second SDH signal to check whether the synchronization is established (step S304). After the J1 synchronization is established (YES in step S304), the sink-side $ID_1$ detector 207 checks whether the J1 byte of the second SDH signal includes the sink-side identification data $ID_1$ which was inserted by the sink-side J1-$ID_1$ insertion device 10 of the previous cross-connect device 1 (step S305). When the sink-side identification data $ID_1$ is detected from the J1 byte of the second SDH signal (YES in step S305), the delay adjustment controller 208 adjusts the reading timing of the second SDH signal from the elastic memory 209 until the alignment detector 211 detects the alignment from the first and second SDH signals read from the elastic memories 205 and 209, in other words, the reading timing of the second SDH signal coincides with that of the first SDH signal (steps S306 and S307). When the reading phase of the second SDH signal coincides with that of the first SDH signal (YES in step S307), the alignment detector 211 outputs the alignment detection signal to the switch 210. Therefore, the switch 210 switches from the #0 system to the #1 system without a hit and changes the output SDH signal from the #0 SDH signal to the #1 SDH signal.

In this manner, after the sink-side identification data $ID_1$ is detected from the J1 byte of the first SDH signal, that is, the cross-connect switch 11 becomes active, the hitless switch device 106 makes the setting of initial delay in reading phase of the first SDH signal. Further, after the sink-side identification data $ID_1$ is detected from the J1 byte of the second SDH signal, the hitless switch device 106 causes the reading phase of the second SDH signal to coincide with that of the first SDH signal and then switches between the first and second SDH signals. In other words, the delay adjustment is not performed when the cross-connect switch 11 is inactive but when it is active. Therefore, the phase differences due to interconnection delays developed in the cross-connect switch 11 of the previous cross-connect device 1 can be eliminated, resulting in the hitless switching with reliability.

It should be noted that the hitless switch device according to the present invention is applicable to a hitless switch device having a plurality of incoming transmission lines, for instance, the hitless switch devices 12 and 14 of the cross-connect device 1.

Figure 1:
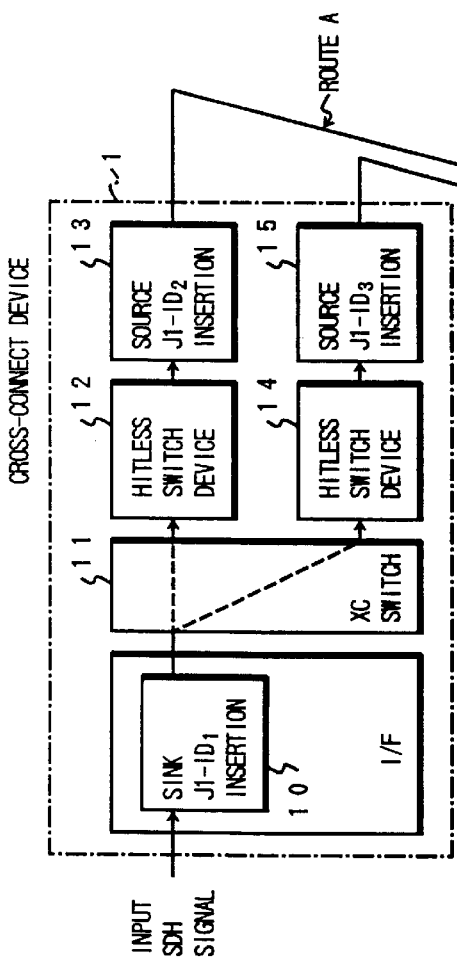
FIG. 1 is a block diagram showing a general cross-connect configuration.

Further, in cases where the present invention is applied to a cross-connect system as shown in FIGS. 1 and 2, the hitless switch device can determine the amount of delay in reading phase based on only the J1 byte including the sink-side ID data of the previous cross-connect stage without the need of determining whether an intermediate cross-connect switch is active or not.

What is claimed is:

1. In a system comprising a plurality of interconnection devices which are connected through a plurality of transmission lines, a method for switching a first path formed in a first transmission line to a second path formed in a second transmission line, comprising the steps of:

at a first interconnection device which is in an active state:
      receiving an input digital signal;
      inserting sink-side identification data into a predetermined field of a frame of the input digital signal to produce a digital signal including the sink-side identification data;
      branching the digital signal including the sink-side identification data into first and second digital signals each including the sink-side identification data; and
      transferring the first and second digital signals to a second interconnecting device through the first and second paths, respectively;
   at the second interconnection device:
      receiving the first and second digital signals from the first interconnection device through the first and second paths, respectively;
      checking whether the sink-side identification data is included in the first and second digital signals;
      adjusting a phase difference between the first and second digital signals based on data of the predetermined field of a frame of each of the first and second digital signals such that the first and second digital signals coincide in phase with each other; and
      switching from the first path to the second path when the first and second digital signals coincide in phase with each other.

2. The method according to claim 1, further comprising at the second interconnection device:
   checking whether the sink-side identification data is included in a current digital signal transferred through a current path which is one of the first and second paths;
   adjusting timing of the current digital signal when the sink-side identification data is included;
   checking whether the sink-side identification data is included in a reserved digital signal transferred through a reserved path which is the other of the first and second paths;
   adjusting a phase difference of the reserved digital signal from the current digital signal based on data of the predetermined field of a frame of each of the current and reserved digital signals such that the current and reserved digital signals coincide in phase with each other; and
   switching from the current path to the reserved path when the current and reserved digital signals coincide in phase with each other.

3. In a system comprising a plurality of cross-connect devices which are connected through a plurality of transmission lines, a method for switching a first path formed in a first transmission line to a second path formed in a second transmission line at a cross-connect device, comprising the steps of:

a) receiving a first digital signal and a second digital signal through the first and second paths, respectively, each of the first and second digital signals having one of source-side identification data and sink-side identification data included in a predetermined field;

b) checking whether the sink-side identification data is included in each of the first and second digital signals;

c) adjusting a phase difference between the first and second digital signals based on data of the predetermined field of a frame of each of the first and second digital signals such that the first and second digital signals coincide in phase with each other, when the sink-side identification data is included in each of the first and second digital signals; and d) switching from the first path to the second path when the first and second digital signals coincide in phase with each other.

4. The method according to claim 3, wherein the steps (b), (c), and (d) comprise the steps of:

checking whether the sink-side identification data is included in a current digital signal transferred through a current path which is one of the first and second paths;

adjusting timing of the current digital signal when the sink-side identification data is included;

checking whether the sink-side identification data is included in a reserved digital signal transferred through a reserved path which is the other of the first and second paths;

adjusting a phase difference of the reserved digital signal from the current digital signal based on data of the predetermined field of a frame of each of the current and reserved digital signals such that the current and reserved digital signals coincide in phase with each other; and switching from the current path to the reserved path when the current and reserved digital signals coincide in phase with each other.

5. A method for switching from a first path to a second path, wherein the first and second paths are formed between a first interconnection device connected to a first path termination device and a second interconnection device connected to a second path termination device, the method comprising the steps of:

at the first interconnection device:

branching an input digital signal received from the first path termination device into a first transmission digital signal and a second transmission digital signal when the first interconnection device is in an active state;

discriminating between a transmission digital signal and an idle digital signal which have a predetermined frame signal format by inserting different identification data into a predetermined field of the predetermined frame signal format, the transmission digital signal passing through an interconnection switch when the first interconnection device is in an active state, and the idle digital signal being generated in the first interconnection device without passing through the interconnection switch;

transmitting the first and second transmission digital signals through the first and second paths, respectively, when the first interconnection device is in the active state; and transmitting first and second idle digital signals through the first and second paths, respectively, when the first interconnection device is not in the active state;

at the second interconnection device:

receiving first and second received digital signals from the first interconnection device through the first and second paths, respectively;

determining whether the first and second received digital signals are the first and second transmission digital signals by checking the identification data inserted into the predetermined field of the predetermined frame signal format;

adjusting a phase difference between the first and second received digital signals based on data of the predetermined field of the predetermined frame signal format such that the first and second received digital signals coincide in phase with each other when the first and second received digital signals are the first and second transmission digital signals; and switching from the first path to the second path when the first and second received digital signals coincide in phase with each other.

6. The method according to claim 5, further comprising at the second interconnection device:

receiving the first received digital signal received from the first interconnection device through the first path;

determining whether the first received digital signal is the first transmission digital signal by checking the identification data inserted into the predetermined field of the predetermined frame signal format;

adjusting timing of the first received digital signal when the first received digital signal is the first transmission digital signal;

receiving the second received digital signal from the first interconnection device through the second path;

determining whether the second received digital signal is the second transmission digital signal by checking the identification data inserted into the predetermined field of the predetermined frame signal format;

adjusting a phase difference of the second received digital signal from the first received digital signal based on data of the predetermined field of the predetermined frame signal format such that the first and second received digital signals coincide in phase with each other; and switching from the first path to the second path when the first and second received digital signals coincide in phase with each other.

7. A system for switching from a first path to a second path, the first and second paths being formed between a first interconnection device and a second interconnection device, the first interconnection device comprising:

an interconnection switch for connecting a plurality of sink-side lines to a plurality of source-side lines in an active state such that a single sink-side line branches into two source-side lines corresponding to the first and second paths, respectively;

a sink-side inserting device connected to the sink-side lines of the interconnection switch, for inserting sink-side identification data into a predetermined field of a frame of an input digital signal to output a digital signal including the sink-side identification data to the single sink-side line of the interconnection switch which branches the digital signal including the sink-side identification data into first and second digital signals each including the sink-side identification data in the active state;

source-side inserting device connected to the source-side lines of the interconnection switch, for inserting source-side identification data into the predetermined field of a frame of each of first and second idle digital signals, and when the first interconnection device is not in the active state; and a transmitter for transmitting the first and second digital signals each including the sink-side identification data to the second interconnection device through the first and second paths, respectively, when the interconnection device is in an active state, and for transmitting the first and second idle digital signals including the source-side identification data to the second interconnection device through the first and second paths, respectively, when the first interconnection device is not in an active state, and the second interconnection device comprising:

a detector for checking whether the sink-side identification data is included in the digital signals received from the first interconnection device through the first and second paths;

a controller for adjusting a phase difference between the first and second digital signals based on data of the predetermined field of a frame of each of the first and second digital signals such that the first and second digital signals coincide in phase with each other when the sink-side identification data is included in the first and second digital signals received from the interconnection device; and a switch for switching from the first path to the second path when the first and second digital signals coincide in phase with each other.

8. The system according to claim 7, wherein the detector comprises:

a first synchronization monitor for monitoring synchronization of the first digital signal;

a first detector for detecting the sink-side identification data from the first digital signal after the synchronization of the first digital signal is established;

a second synchronization monitor for monitoring synchronization of the second digital signal; and a second detector for detecting the sink-side identification data from the second digital signal after the synchronization of the second digital signal is established.

9. The system according to claim 7, wherein the controller comprises:

a storage device for storing the first and second digital signals; and a reading controller for controlling read timing of the first and second digital signals stored in the storage device such that the first and second digital signals coincide in phase with each other when the sink-side identification data is included in the first and second digital signals.

10. A hitless switching device for switching from a first path to a second path, comprising:

a receiver for receiving a first digital signal and a second digital signal through the first and second paths, respectively, each of the first and second digital signals having one of source-side identification data and sink-side identification data included in a predetermined field thereof;

detector for checking whether the sink-side identification data is included in the first and second digital signals;

a controller for adjusting a phase difference between the first and second digital signals based on data of the predetermined field of a frame of each of the first and second digital signals such that the first and second digital signals coincide in phase with each other; and a switch for switching from the first path to the second path when the first and second digital signals coincide in phase with each other.

11. The hitless switching device according to claim 10, wherein the detector comprises:

a first synchronization monitor for monitoring synchronization of the first digital signal;

a first detector for detecting the sink-side identification data from the first digital signal after the synchronization of the first digital signal is established;

a second synchronization monitor for monitoring synchronization of the second digital signal; and a second detector for detecting the sink-side identification data from the second digital signal after the synchronization of the second digital signal is established.

12. The hitless switching device according to claim 10 wherein the controller comprises:

a storage device for storing the first and second digital signals; and a reading controller for controlling read timing of the first and second digital signals stored in the storage device, such that the first and second digital signals coincide in phase with each other when the sink-side identification data is included in the first and second digital signals.

* * * * *